(12) United States Patent
Tsubakihara

(10) Patent No.: US 7,415,572 B2
(45) Date of Patent: Aug. 19, 2008

(54) FILE SYSTEM, FILE RECORDING METHOD, AND FILE READING METHOD

(75) Inventor: Kazuyuki Tsubakihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 11/137,150

(22) Filed: May 25, 2005

(65) Prior Publication Data

US 2005/0265162 A1 Dec. 1, 2005

(30) Foreign Application Priority Data

May 27, 2004 (JP) ............................. 2004-158017

(51) Int. Cl.
*G06F 12/00* (2006.01)
(52) U.S. Cl. ...................... 711/112; 711/150; 711/154; 711/167
(58) Field of Classification Search ........................ None
See application file for complete search history.

(56) References Cited

U.S. PATENT DOCUMENTS 6,694,092 B1 * 2/2004 Hayashi ...................... 386/124

7,093,256 B2 * 8/2006 Bloks .......................... 718/102

FOREIGN PATENT DOCUMENTS

| JP | 5-204725 A | 8/1993 |
|---|---|---|
| JP | 2000-267904 A | 9/2000 |
| JP | 2000-339868 A | 12/2000 |

* cited by examiner

*Primary Examiner*—Reginald G. Bragdon
*Assistant Examiner*—Shawn X Gu
(74) *Attorney, Agent, or Firm*—Canon U.S.A. Inc., I.P. Division

(57) ABSTRACT

A file system is capable of reading and writing a large amount of stream data, such as digital video/audio data, in real time, and is also capable of efficiently dealing with a normal data file of a small size. In the file system, realtime stream data is recorded in a recording apparatus while dividing the data into data units, each data unit corresponding to a predetermined time interval and being composed of a series of blocks, so as to form a realtime data file. When the realtime data file is read in real time, the data stored in the series of blocks is read at one time. Whether the data can be recorded or read is determined in accordance with a schedule of a recording/reading process of other realtime data or non-realtime data. The data is recorded or read in accordance with the determination result.

8 Claims, 11 Drawing Sheets

FIG. 9

| | FILE IDENTIFIER | MANAGEMENT INFORMATION ENTRY NUMBER | INPUT/OUTPUT TYPE |
|---|---|---|---|
| 902 | A | 8 | REAL TIME |
| 903 | B | 5 | NORMAL |
| 904 | C | 20 | NORMAL |
| 905 | D | 13 | REAL TIME |
| 906 | E | 4 | REAL TIME |
| 907 | F | 6 | NORMAL |

| | MANAGEMENT INFORMATION ENTRY NUMBER | ESTIMATION/ RECORDING UNIT (ms) |
|---|---|---|
| 1002 | 8 | 40/500 |
| | 5 | |
| | 20 | |
| 1003 | 13 | 30/500 |
| 1004 | 4 | 30/1000 |
| | 6 | |

1001

FILE SYSTEM, FILE RECORDING METHOD, AND FILE READING METHOD

BACKGROUND OF THE INVENTION

1. Field of the Invention

The present invention relates to a file system, a file recording method, and a file reading method. More particularly, the present invention relates to a file system, a file recording method, and a file reading method capable of inputting/outputting a large amount of data which needs to be read/written in real time, such as video data and audio data.

2. Description of the Related Art

In recent years, standardization of digital compression techniques, such as MPEG 1 and MPEG 2, has proceeded. Also, a high performance CPU (central processing unit), memory, and data accumulating medium are available with low prices. Under this circumstance, many types of multimedia apparatuses for accumulating video and audio data by digitalizing it and for processing a large amount of digital data are commercialized.

When digitalized video and audio data is written to a recording medium or read from a recording medium, a file managing apparatus (called a file system) allocates clusters, manages unused clusters, and manages data list information, as in reading/writing data in a computer.

In a file system, a data area of a recording medium is divided into one or more clusters, each having a specific fixed length, and a cluster map for managing a use condition of each cluster is provided. In a typical computer, a size of each cluster is set to 512 bytes, 2 kilobytes, or 4 kilobytes.

When data is recorded or played back in units of clusters, a recording or playback process is performed based on a unit called a block on a recording medium.

The block is a unit of recording/playback and has a fixed length which is set in each recording medium. In a hard disk, the capacity of the block is usually 512 bytes. The block is accessed based on a number (address) corresponding to a logical block. In a hard disk, by specifying an address of a block at a start position of recording or playback and the number of blocks to be recorded or played back, data of sequential blocks starting from the specified block can be transferred.

The above-mentioned cluster is composed of an integral multiple of the block, and sequential addresses are assigned thereto. In such a file system, sequentiality of blocks is ensured in one cluster, and thus input/output of data is performed in units of clusters (repeats input/output in units of clusters).

In the file system, however, since an area is obtained in units of clusters, the area is fragmented by repeated creation and deletion of files. That is, it becomes difficult to keep clusters forming a sequential file, and as a result, data cannot be transferred continuously.

When data is not continuously transferred in a disk-shaped recording medium, such as a hard disk, seek time for moving a disk head to a cylinder position including a target block (sector) and waiting time until the target sector reaches a head position cause degradation in performance.

For this reason, when disk performance needs to be increased in a file system, the number of blocks forming one cluster may be increased. Accordingly, the sequentiality of blocks forming a cluster can be ensured, and thus many blocks can be input/output at one time even if fragmentation occurs.

However, using such a large cluster involves a problem. That is, even if a data size of a created file is small, e.g., 1 byte, the file occupies one large cluster. The cluster is regarded as a used cluster, which decreases effective usage efficiency. Also, a large amount of data equivalent to one cluster must be transferred in order to input/output only 1-byte data, which is inefficient.

In an apparatus (e.g., a personal computer) dealing with both a file of small data size and a file requiring an input/output performance, such as a stream data file represented by an MPEG 2 data file, a tradeoff between usage efficiency and an input/output performance must be considered.

In a conventional file system, dealing with a plurality of stream data files at the same time is not taken into consideration. When a plurality of stream data files are simultaneously dealt with, for example, when recorded program data is played back while another program data is being recorded, when a program is played back while recording it, or when data of a plurality of programs is recorded at the same time, a technique of protecting a realtime performance against input/output of a normal file which asynchronously interrupts is required.

SUMMARY OF THE INVENTION

The present invention provides a file system capable of reading and writing a large amount of stream data, such as video and audio data, while ensuring a realtime performance.

Also, the present invention provides a file system capable of reading and writing data while ensuring a realtime performance and efficiently processing data of a small size.

Also, the present invention provides a file recording method and a file reading method in which fragmentation of an area can be reduced.

According to an aspect of the present invention a file system includes a recording device and a first determining device. The recording device is configured to divide data into data units. Each data unit corresponds to a predetermined time interval. The recording device is also configured to record the data units at a series of blocks in a recording apparatus so as to form a file. The first determining device is configured to determine whether the data can be recorded while ensuring a realtime performance based on a recording schedule of other data before the recording device performs a data recording process. The recording device performs the data recording process in accordance with the determination made by the first determining device.

According to another aspect of the present invention, a file recording method includes: dividing data into data units, each data unit corresponding to a predetermined time interval; determining whether the data can be recorded while ensuring a realtime performance based on a recording schedule of other data; recording the data units at a series of blocks in a recording apparatus so as to form a file in accordance with the determination as to whether the data can be recorded while ensuring realtime performance based on the recording schedule of other data.

According to yet another aspect of the present invention, a file system includes a recording device, a reading device and a determining device. The recording device is configured to divide data into data units, each data unit corresponding to a predetermined time interval and to record the data units at a series of blocks in a recording apparatus so as to form a file. The reading device is configured to read entire data units recorded in the series of blocks at one time from the recording apparatus. The determining device is configured to determine whether the data units recorded in the series of blocks can be read while ensuring a realtime performance based on a reading schedule of other data before the reading device performs a data reading process. The reading device is configured to perform the data reading process in accordance with the determination made by the determining device.

According to still another aspect of the present invention, a file reading method includes: dividing data into data units, each data unit corresponding to a predetermined time interval; recording the data units at a series of blocks in a recording apparatus so as to form a file; determining whether the data units recorded in the series of blocks can be read while ensuring a realtime performance based on a reading schedule of other data before reading the data units; and reading all of the data units recorded in the series of blocks at one time from the recording apparatus in accordance with the determination of whether the data units recorded in the series of blocks can be read while ensuring realtime performance based on the reading schedule of other data.

Further features and advantages of the present invention will become apparent from the following description of an exemplary embodiment with reference to the attached drawings.

BRIEF DESCRIPTION OF THE DRAWINGS

FIG. 9 shows a configuration of a session table according to the embodiment.

FIG. 10 shows a schedule management table according to the embodiment.

DESCRIPTION OF THE EMBODIMENT

Hereinafter, an embodiment of the present invention will be described.

Figure 1:
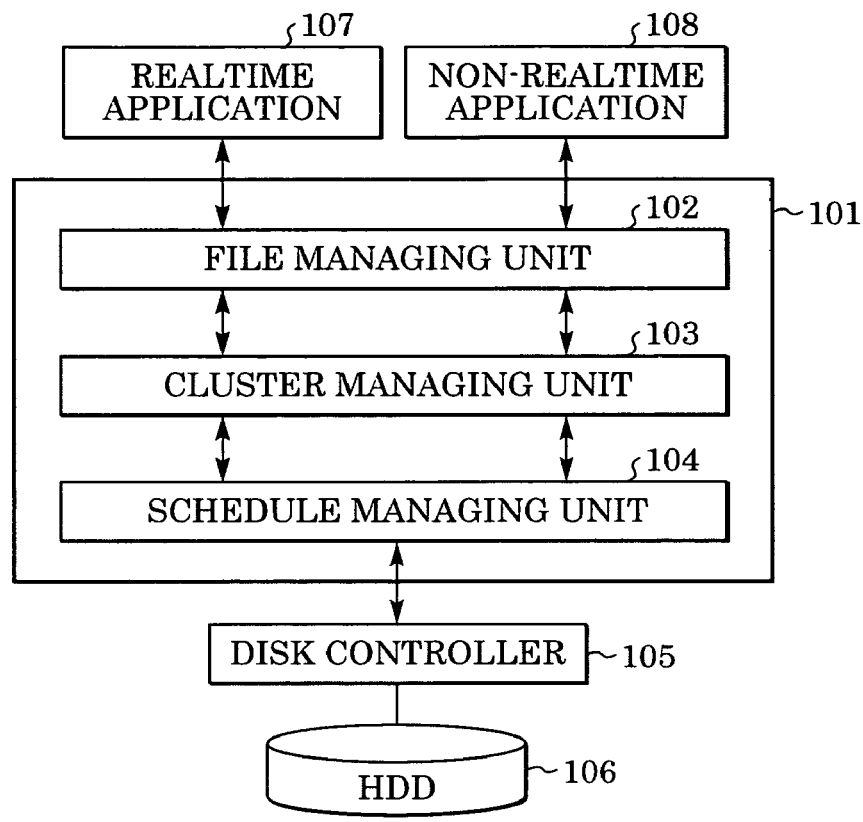
FIG. 1 is a block diagram showing a configuration of a file system according to an embodiment of the present invention.

FIG. 1 is a block diagram showing a configuration of a file system 101 according to the embodiment of the present invention.

The file system 101 includes a file managing unit 102, a cluster managing unit 103, and a schedule managing unit 104, and provides file input/output services to various applications on a file recording apparatus. Also, the file system 101 requests input/output of data to a disk controller 105 (described later) by specifying a top block number and a number of blocks, and executes an input/output process.

The file managing unit 102 searches for an identification (ID) information entry and a management information entry of a file based on a file name used in an application. If a corresponding entry does not exist, the file managing unit 102 newly assigns an entry to the file. Further, after a management information entry has been successfully found in the file or newly assigned thereto, a file identifier is given to the file so that both the application and the file system 101 can identify the file. The file identifier is registered in a session table. Thereafter, the file identifier is used instead of the file name to specify the file. Details of the ID information entry and the management information entry are described later.

Each of clusters is composed of sequential blocks, each block being a unit forming an internal configuration of a hard disk drive (HDD) 106. In the file system 101, the cluster (not a block) is used as a unit of input/output. The cluster managing unit 103 manages clusters in the HDD 106 by using a cluster map indicating which clusters are used/unused. When a file is created, clusters are obtained from among the unused clusters as necessary, and the clusters are allocated to the file and registered in the management information entry of the file. Also, the cluster managing unit 103 has a function of finding clusters allocated to an existing file based on information which is registered in the management information entry of the file.

The schedule managing unit 104 manages input/output between a plurality of applications and the HDD 106, and controls input/output in accordance with priority control and a schedule. Further, when opening a realtime data file, the schedule managing unit 104 checks whether the file can be input/output under a required schedule. If input/output under the required schedule is impossible, the schedule managing unit 104 refuses to open the file. If possible, the schedule managing unit 104 registers the file in a schedule management table.

The disk controller 105 has a function of reading data from the HDD 106 and writing data thereto. A direct memory access (DMA) may be used to transfer data. The HDD 106 stores various pieces of data.

A realtime application 107 includes, for example, a video/music browsing application and a distribution service. Typically, the realtime application 107 deals with realtime data files and inputs/outputs a large amount of stream data on a regular basis.

A non-realtime application 108 includes, for example, a text editor and a file transfer application, and typically generates input/output of a file asynchronously.

Figure 2:
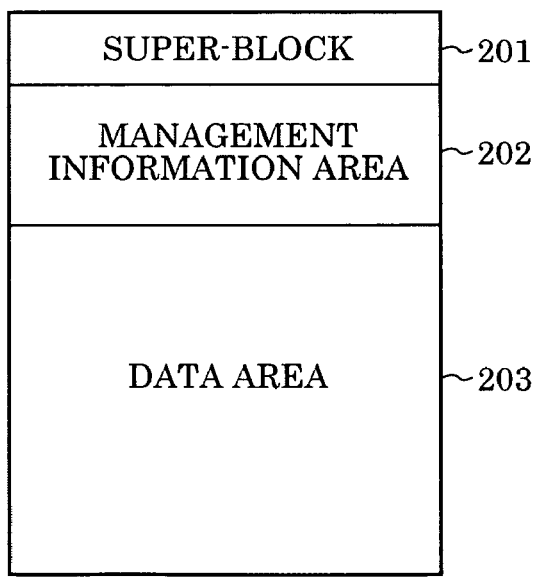
FIG. 2 shows a logical internal configuration of a hard disk drive (HDD) according to the embodiment.

FIG. 2 shows a logical configuration inside the HDD 106. The logical configuration of the HDD 106 includes a super-block 201, a management information area 202, and a data area 203.

The super-block 201 stores characteristics of the file system 101, which is logically constituted in the HDD 106. The characteristics include the number of management information entries and the number of clusters.

The management information area 202 stores a group of management information entries. Each management information entry, which will be described later, manages and holds information of one file or directory. Therefore, even if free space exists in the data area 203 (described later), the number of files or directories to be created must be within the number of management information entries. Management information entry numbers 1 to N are given to the respective management information entries.

The data area 203 stores a group of clusters. The clusters can be classified as follows depending on a purpose of use:
    direct data clusters to directly hold part or all of data forming a file;
    indirect data clusters to hold a group of addresses of the direct data clusters;

double indirect data clusters to hold a group of addresses of the indirect data clusters; and directory clusters to hold names of files or child directories existing in a directory and management information entry numbers corresponding to the files or child directories.

Details of these clusters are described later.

All of the clusters in the data area 203 are managed by the cluster managing unit 103 by using a cluster map, which indicates used clusters together with their application and unused clusters. Further, the cluster map indicates management information entries to which the respective clusters belong and the type of each file (a realtime data file or a normal data file).

Content of the management information entry is described next. There are two types of management information entries: (1) for a realtime data file; and (2) for a normal data file. The type is specified when a file is created. The management information entry is a fixed-length entry. The size thereof is typically smaller than that of a cluster, so that a plurality of entries can be recorded in one cluster. Therefore, files and directories can be efficiently managed.

Figure 3:
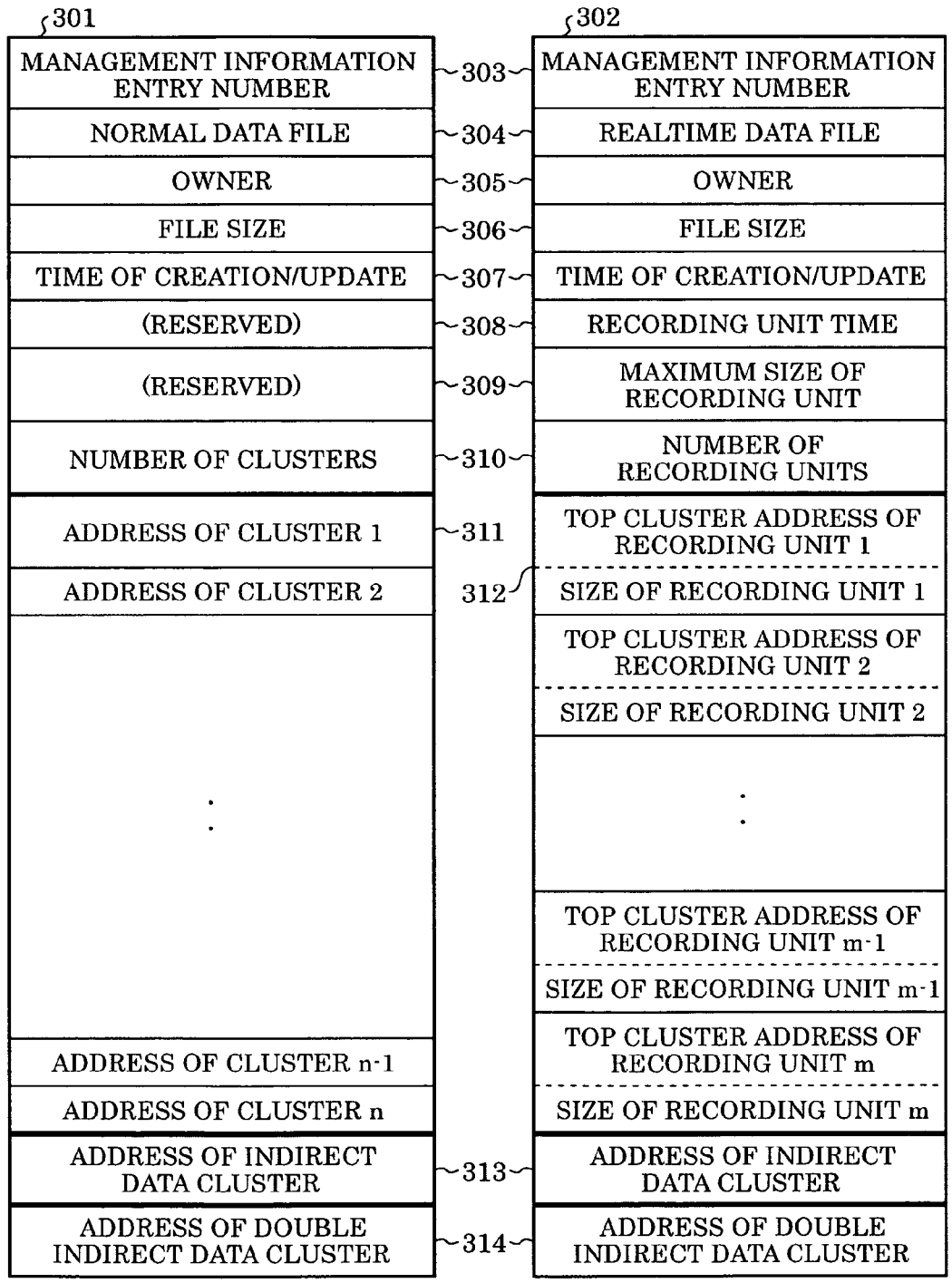
FIG. 3 shows examples of a management information entry according to the embodiment.

FIG. 3 shows the management information entry. The management information entry includes a management information entry 301 for a normal data file and a management information entry 302 for a realtime data file.

The management information entries 301 and 302 have common fields 303 to 310, 313, and 314. In addition, the entry 301 has a field 311 and the entry 302 has a field 312, the fields being different from each other. The fields 301-314 in the management information entries 301 and 302 are described next.

A management information entry number field 303 indicates an ordinal position of the entry in the management information area 202 of the HDD 106. That is, a number in the range of the number of management information entries held in the super-block 201 is recorded in the management information entry number field 303.

A file type field 304 indicates whether the file is a "normal data file", a "realtime data file", or a "directory".

An owner field 305 records information about an owner of the file and an access right.

A file size field 306 records a file size.

A time of creation/update field 307 records time when the file was created or was last updated.

A recording unit time field 308 is significant only in a realtime data file and holds a recording unit time informed at creation of the file. The recording unit time field 308 is not significant in a normal data file and serves as a reserved field. Whether the file is a realtime data file or not can be determined from the content of the file type field 304.

A recording unit maximum size field 309 is significant only in a realtime data file and records a maximum size of a recording unit among recording units forming the file. The recording unit maximum size field 309 serves as a reserved field for normal data files.

A number of recording units field 310 records the number of recording units forming the file. When the file is a normal data file, the recording unit is fixed to one cluster, so that the number recorded in this field 310 is equivalent to the number of all of the clusters forming the file. On the other hand, when the file is a realtime data file, the amount of time corresponding to the amount of data recorded in the file can be calculated by multiplying the number of recording units by the recording unit time.

An indirect data cluster address field 313 and a double indirect data cluster address field 314 hold addresses of indirect data clusters and double indirect data clusters, respectively.

A cluster address field 311 is used for a normal data file. Pieces of data forming the file are actually recorded in direct data clusters whose addresses are recorded in the cluster address field 311. The pieces of data are recorded in the same order as the address sequence. Since the management information entry has a fixed length, the number of cluster address fields is limited. When a file size is large and when the number of fields is insufficient, the above-described indirect data cluster address field 313 and the double indirect data cluster address field 314 are used, so that direct data clusters forming the file are sequentially recorded.

A recording unit field 312 is composed of a top cluster address field and a recording unit size field, and is used for a realtime data file. The realtime data file holds pieces of realtime data, each piece having a data size corresponding to the recording unit time informed at creation of the file (the time recorded in the recording unit time field 308). Sequential clusters are allocated to each piece of the data corresponding to the recording unit time so that the piece of the data can be transferred to the HDD 106 at one time.

Therefore, the top cluster address field holds an address of a top cluster of clusters which record the data corresponding to the recording unit time. The recording unit size field holds a data size corresponding to the recording unit time.

On the other hand, at a process of reading a file, data of a recording unit size can be transferred and read at one time starting from a cluster indicated by a top cluster address. A configuration of a realtime data file is indicated by a sequence of recording unit fields. As in a normal data file, when the number of fields is insufficient, the indirect data cluster address field 313 and the double indirect data cluster address field 314 are used.

For a directory (neither a normal data file nor a realtime data file), the management information entry 301 for a normal data file is used. In this case, information indicating a "directory" is stored in the file type field 304.

Various clusters of data area clusters forming a normal data file are described next.

Figure 4:
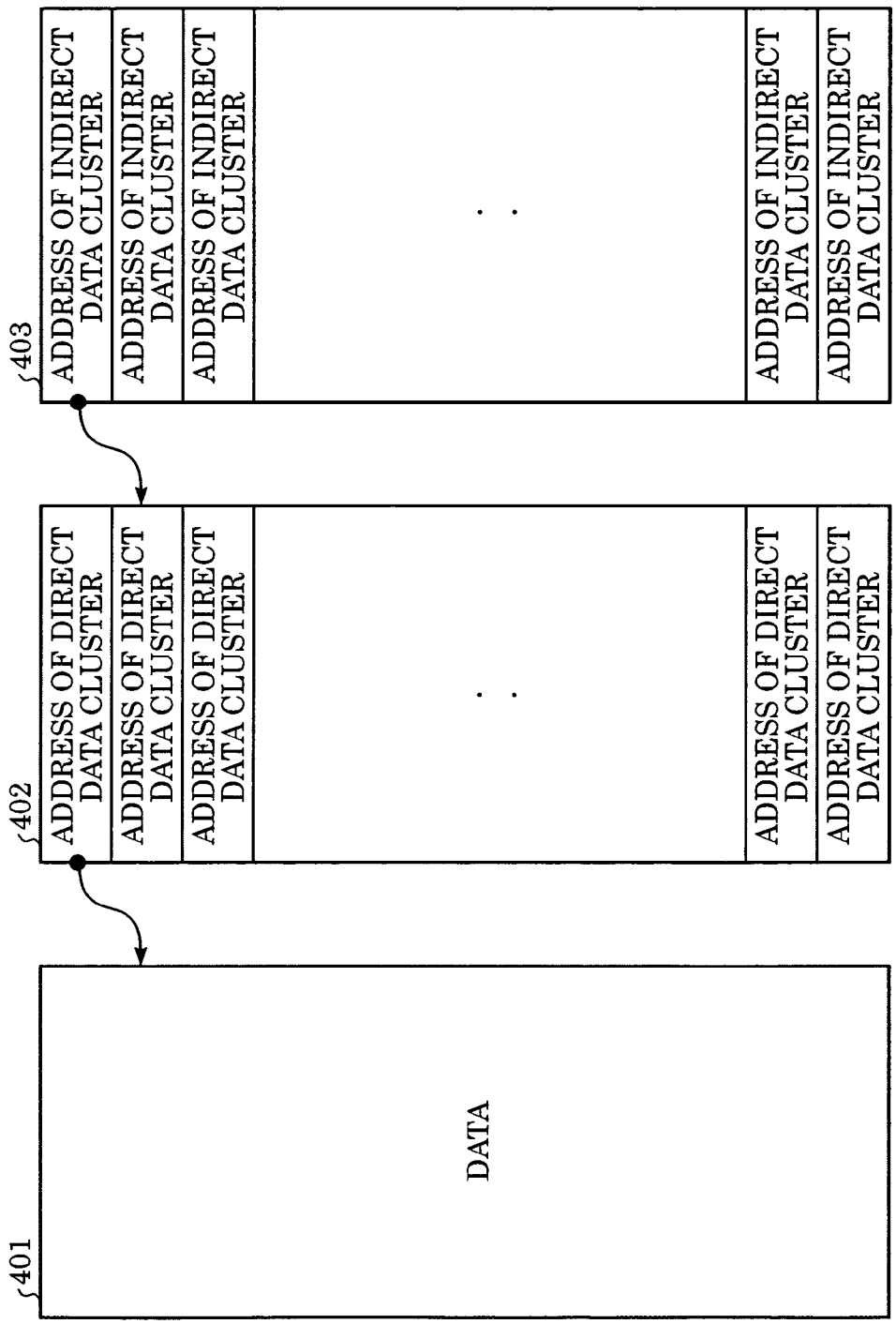
FIG. 4 shows various clusters belonging to data area clusters forming a normal data file according to the embodiment.

FIG. 4 shows various clusters of data area clusters forming a normal data file.

A direct data cluster 401 records data which forms a file and is referred to when an address thereof is specified through a management information entry or an indirect data cluster (described later).

An indirect data cluster 402 is referred to when an address thereof is specified through a management information entry or a double indirect data cluster (described later). The indirect data cluster 402 records an address sequence of the direct data cluster 401.

A double indirect data cluster 403 is referred to when an address thereof is specified through a management information entry. The double indirect data cluster 403 records an address sequence of the indirect data cluster 402.

As described above, entire data of a normal data file is recorded in the direct data cluster 401. The data can be referred to in the following three methods:

(1) directly refers to the data from a cluster address sequence recorded in a management information entry;

(2) indirectly refers to the data from an indirect data cluster address recorded in a management information entry (indirect data cluster→direct data cluster); and (3) double-indirectly refers to the data from a double indirect data cluster address recorded in a management information entry (double indirect data cluster→indirect data cluster→direct data cluster).

A file of a small data size can be referred to only by method (1). As the file size increases, methods (2) and (3) become necessary.

Next, various clusters belonging to data area clusters forming a realtime data file are described below.

Figure 5:
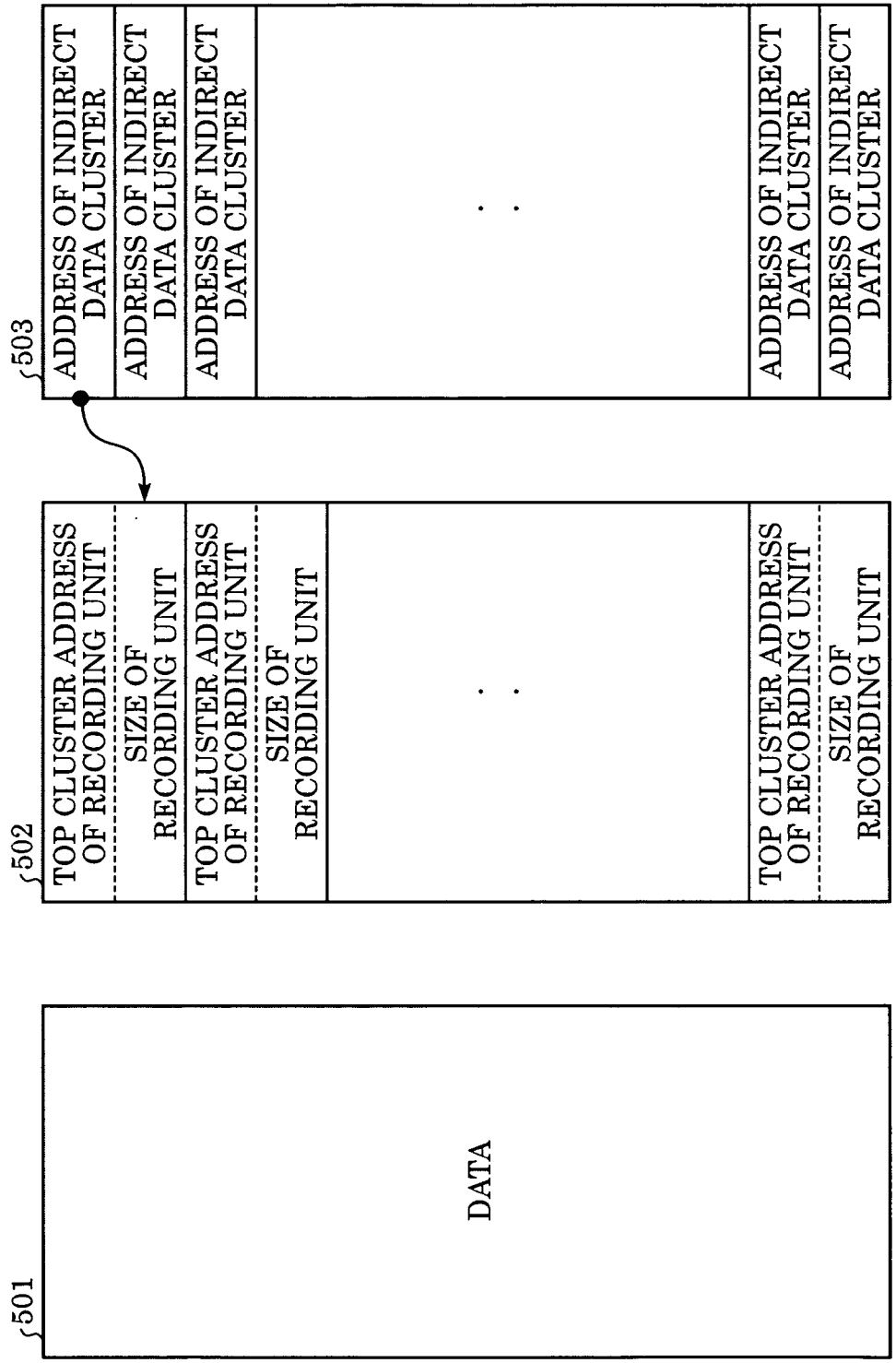
FIG. 5 shows various clusters belonging to data area clusters forming a realtime data file according to the embodiment.

FIG. 5 shows various clusters belonging to data area clusters forming a realtime data file.

In FIG. 5, a direct data cluster 501 and a double indirect data cluster 503 are identical to the direct data cluster 401 and the double indirect data cluster 403.

As shown in FIG. 5, an indirect data cluster 502 has a different configuration from that in a normal data file. As in the above-described management information entry, the indirect data cluster 502 holds pairs of a top cluster address and a recording unit size, instead of cluster addresses.

As described above, entire data of a realtime data file is recorded by using recording units, each being composed of a series of direct data clusters.

Figure 6:
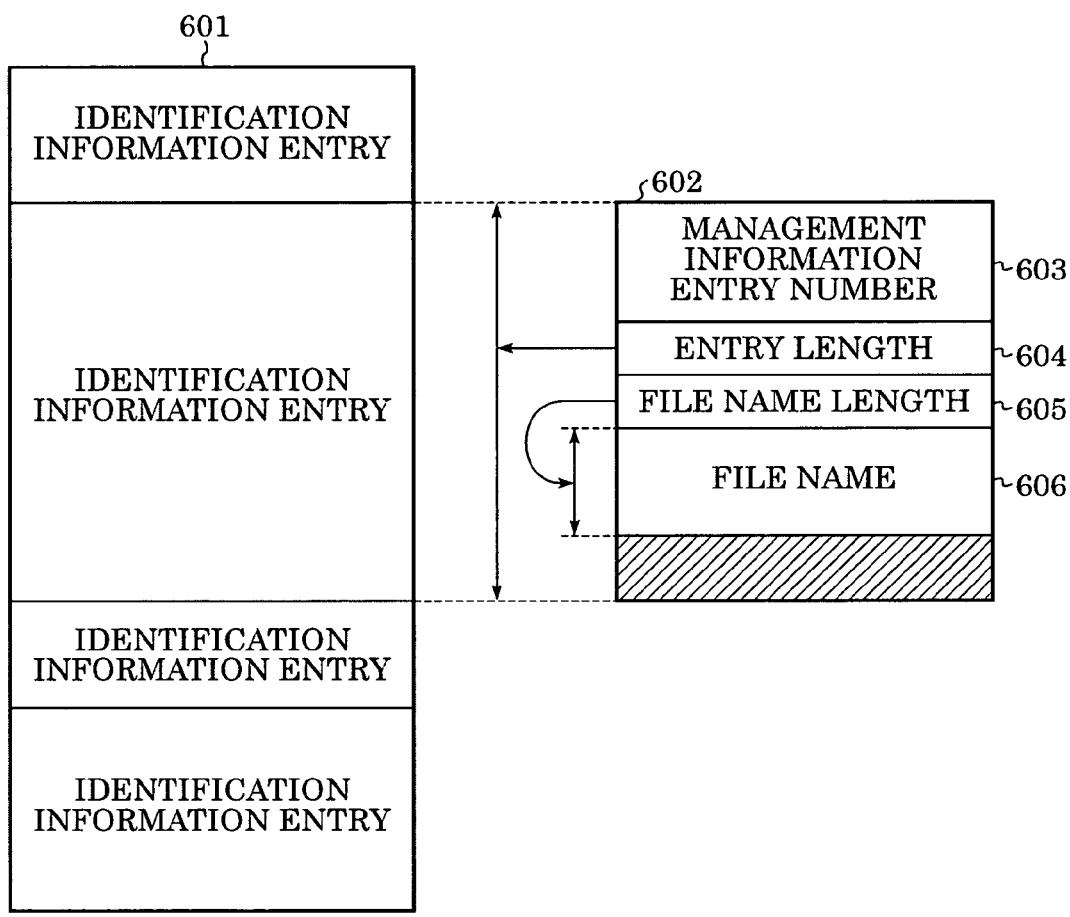
FIG. 6 shows a directory cluster forming a directory according to the embodiment.

A directory cluster forming a directory is described next. FIG. 6 shows a directory cluster 601 forming a directory.

The directory cluster 601 is equivalent to a direct data cluster with respect to a file, and records a sequence of ID information entries. The ID information entry exists for each file or each child directory of a directory and records a file name or a directory name and a corresponding management information entry number. Since a length of the file name and the directory name can vary, the ID information entry serves as a variable-length entry.

An internal configuration 602 of the ID information entry shown in FIG. 6 includes a management information entry number field 603 used to record a management information entry number which is associated with the ID information entry. Any of numbers from 1 to N (N is the number of management information entries) is used as the management information entry number. Based on this number, a block address in the HDD 106 recording the management information entry can be found.

An ID information entry having a number 0 (zero) is a special and indefinite entry and indicates that the subsequent field(s) is (are) insignificant. Therefore, even when ID information entries having a management information entry number 0 exist, the directory does not include any file and any child directory. In other words, the number of ID information entries does not always match the number of files or child directories.

An entry length field 604 holds a size of the entire entry. A file name length field 605 records a size of a file name.

As can be seen in FIG. 6, an extra field may exist after a file name field 606. However, a range of a significant area can be determined by referring to an entry length and a file name length.

Having the above-described configuration, the ID information entries can be reused even if a file is deleted or a file name is changed, and thus increased processing efficiency can be obtained.

A process performed by the file managing unit 102 of referring to an actually existing file (/tmp/test.txt) is described next.

First, the file managing unit 102 refers to a management information entry having an entry number 1. The management information entry having an entry number 1 is used as an entry corresponding to a root directory (/). In this way, a position on the HDD 106 of the management information entry can be determined based on the management information entry number, so that the entry can be read.

By referring to a directory cluster that can be referred to from the management information entry having an entry number 1, an ID information entry recoding "tmp" as a file name (directory name) is found. The found entry holds an entry number of a management information entry corresponding to a "tmp directory", so that the entry can be read.

By repeating the above-described process, an ID information entry recording a file name "test.txt" is eventually found and the management information entry is found, so that the data "test.txt" in direct data clusters can be accessed.

Figure 7:
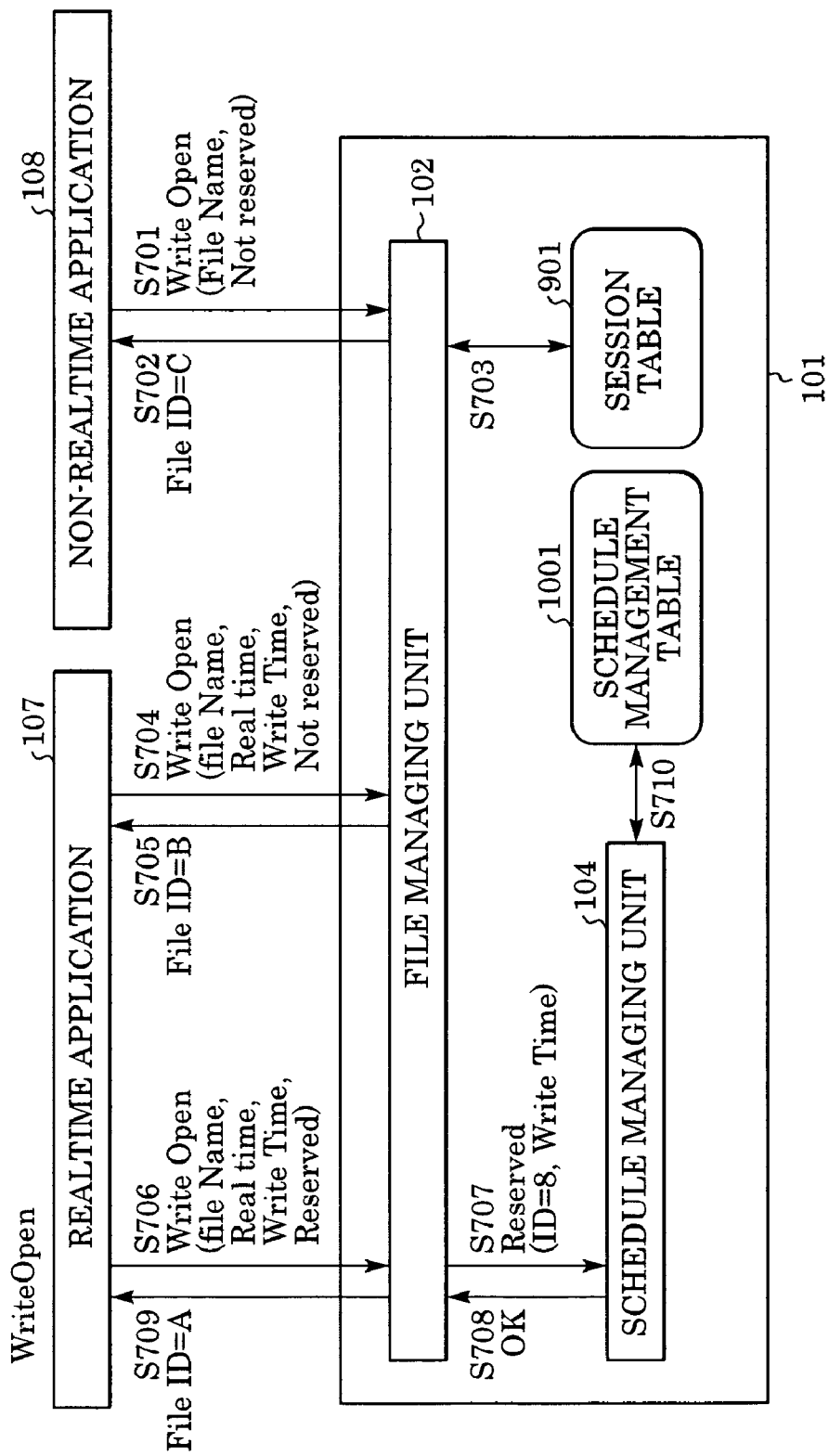
FIG. 7 illustrates a WriteOpen process according to the embodiment.
Figure 8:
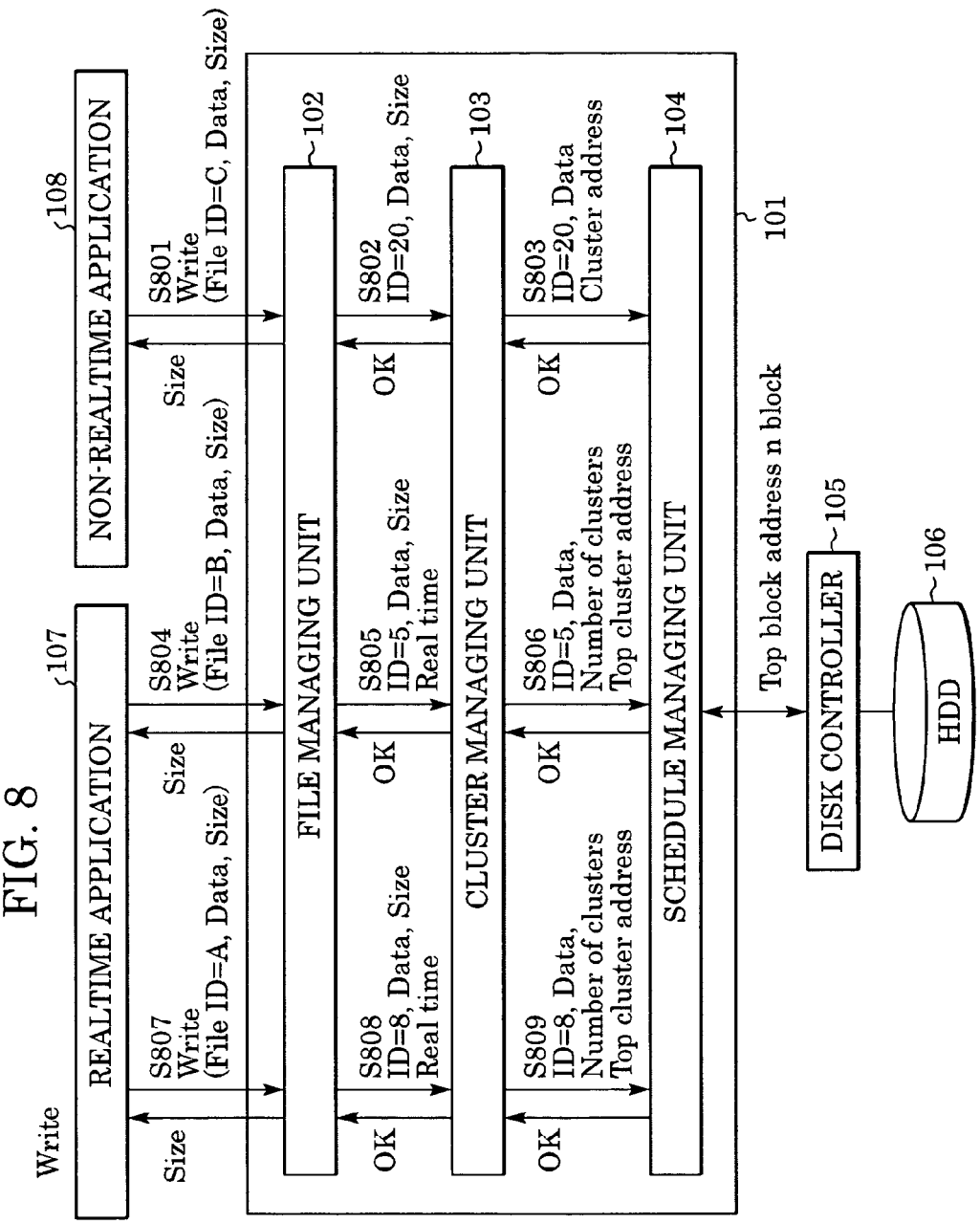
FIG. 8 illustrates a Write process according to the embodiment.

Next, a process of creating a file is described. FIG. 7 illustrates a WriteOpen process and FIG. 8 illustrates a Write process.

First, a process of creating a normal data file is described (same as in the conventional file system).

In order to create a file, an application issues a WriteOpen request to the file system 101.

Specifically, a non-realtime application 108 for creating a normal data file issues a WriteOpen request (step S701), with a file name being a parameter.

The file managing unit 102 receives the request, creates a new ID information management entry in a directory cluster of a corresponding directory, obtains a new management information entry from the management information area 202 of the HDD 106, and records a management information entry number, a file name, and a file name length thereof in the ID information entry.

Also, the type field 304 of the management information entry is set to a normal data file. Further, a file identifier for identifying this Write session between the application 108 and the file system 101 is assigned to the file. The file managing unit 102 transmits the file identifier to the application 108 (step S702), and then the WriteOpen process is completed. In addition, the file managing unit 102 associates the management information entry with the file identifier and registers them in a session table 901 (step S703).

FIG. 9 shows a configuration of the session table 901. The session table 901 records file identifiers, management information entry numbers, and input/output types (normal or realtime).

Then, the application 108 issues a Write request for each piece of data having a predetermined size and writes the data in the file. Parameters of the Write request include the file identifier assigned at the WriteOpen process, a pointer to data to be written, and a size of data to be written (step S801 of FIG. 8).

The file managing unit 102 of the file system 101 receives the Write request, refers to the session table 901 based on the file identifier, finds an associated management information entry number (in this case 20: 904 in FIG. 9), and issues a Write request to the cluster managing unit 103 by using the entry number as a parameter (step S802).

The cluster managing unit 103 divides the received data into pieces each having a cluster size, allocates direct data clusters to the respective pieces of data, and records the clusters in the management information entry. If necessary, an indirect data cluster and a double indirect data cluster are obtained so as to record the data therein. Also, information of the cluster map is updated. Then, the cluster managing unit 103 transmits cluster addresses of the clusters allocated to the divided data, the number of clusters (in this case, fixed to 1), and the divided data to the schedule managing unit 104 (step S803). This step S803 is repeated until the entire data has been recorded.

Next, a process of creating a realtime data file is described.

Two realtime data file creating methods are used depending on whether or not a realtime performance is ensured to write data. For example, when realtime video stream data input from a video input apparatus is to be recorded in a file, a realtime performance must be ensured. On the other hand, when a duplicate file of an existing realtime data file is to be created, the realtime performance need not be ensured.

First, a case where a realtime performance is not ensured is described.

The realtime application 107 for creating a file issues a WriteOpen request, with a file name being a parameter. At this time, the application 107 notifies the file managing unit 102 that the file to be created is a realtime data file and that a recording unit time and a realtime performance need not be ensured (step S704 of FIG. 7).

The file managing unit 102 receives the request and notifies the application 107 of a file identifier (step S705), as in the case of creating a normal data file. In a management information entry, the type field 304 is set to a realtime data file and the recording unit time is recorded in the field 308. Also, the recording unit maximum size field 309 is temporarily set to 0 (zero).

Then, the application 107 writes realtime data. Unlike in a normal data file, the application 107 issues a Write request for each piece of data corresponding to the recording unit time. Parameters used at the Write request are the same as in the case of a normal data file (step S804 of FIG. 8).

The file managing unit 102 of the file system 101 receives the Write request, refers to the session table 901 based on the file identifier, and finds an associated management information entry number (in this case 5). Then, the file managing unit 102 transmits a Write request to the cluster managing unit 103, with the entry number being a parameter (step S805). At the same time, the file managing unit 102 compares a size of data to be written with the recording unit maximum size recorded in the management information entry. If the size of data to be written is larger, the recording unit maximum size is updated.

The cluster managing unit 103 recognizes that the type of file is a realtime data file by referring to the management information entry, allocates sequential clusters so that the entire data can be written therein, and records an address of a top cluster and a data size in the management information entry. If necessary, an indirect data cluster and a double indirect data cluster are obtained and used. Further, the cluster managing unit 103 updates the information of the cluster map.

On the other hand, since a realtime performance need not be ensured at a writing process, the cluster managing unit 103 divides the data into pieces, each piece having a cluster size, and transmits an address of each cluster, the number of clusters, and the divided data to the schedule managing unit 104 (step S806). This step is repeated until the entire divided data has been recorded.

Next, a case where a realtime performance needs to be ensured is described.

The application 107 for creating a file issues a WriteOpen request, with a file name being a parameter (step S706 of FIG. 7). At this time, the application 107 notifies the file managing unit 102 that the file to be created is a realtime data file and that a recording unit time and a realtime performance need be ensured. Further, the application 107 transmits an estimated recording unit maximum size.

The file managing unit 102 receives the request and performs the same process as that in a case where a realtime performance need not be ensured. In addition, the file managing unit 102 requests the schedule managing unit 104 to ensure a realtime performance by using the recording unit time, the estimated recording unit maximum size, and the management information entry number as parameters (step S707).

FIG. 10 shows a schedule management table 1001. The schedule managing unit 104 receives the request and estimates time required for writing recording units based on the estimated recording unit maximum size. Also, the schedule managing unit 104 refers to the schedule management table 1001 shown in FIG. 10 together with the recording unit time, so as to determine whether the realtime performance can be ensured.

Actually, the session table 901 and the schedule management table 1001 need not be separated, but these tables may be combined. Determining that the realtime performance can be ensured, the schedule managing unit 104 registers the management information entry number, the recording unit time, and the estimated writing time in the schedule management table 1001 (1002 in FIG. 10). When the schedule managing unit 104 determines that the realtime performance cannot be ensured, the schedule managing unit 104 notifies the file managing unit 102 of the determination result. In this case, the WriteOpen request from the application 107 cannot be accepted, and thus the file cannot be created.

Whether the realtime performance can be ensured is determined based on whether the estimated write time is not too long (whether the data size of recording unit is not too large) and whether an occupancy rate obtained from a proportion of the estimated write time to the recording unit time is not too high (for example, when the recording unit time is 500 ms and the estimated write time is 50 ms, the occupancy rate is 0.1), while considering the entire schedule that has been registered in the schedule management table 1001 and that is managed therein.

After a successful WriteOpen process, the application 107 writes realtime data. First, the application 107 issues a Write request for each piece of data, the piece having a data size corresponding to the above-described recording unit time. Parameters used at the Write request are the same as in a normal data file (step S807 of FIG. 8).

The file managing unit 102 receives the write request, refers to the session table 901 based on the file identifier, and finds an associated management information entry number (in this case 8). Then, the file managing unit 102 transmits a Write request to the cluster managing unit 103, with the entry number being a parameter (step S808). At the same time, the file managing unit 102 compares a size of data to be written with the recording unit maximum size recorded in the management information entry. If the size of data to be written is larger, the file managing unit 102 updates the recording unit maximum size.

The cluster managing unit 103 recognizes that the type of file is a realtime data file by referring to the management information entry. Then, the cluster managing unit 103 allocates sequential clusters to the received data so that the entire data can be recorded therein without dividing the received data into pieces of a cluster size. Further, the cluster managing unit 103 records an address of a top cluster and a data size in the management information entry. If necessary, an indirect data cluster and a double indirect data cluster are obtained and used. Also, the cluster managing unit 103 updates information of the cluster map. Then, the cluster managing unit 103 transmits the top cluster address of the allocated sequential clusters, the number of recording blocks, and the entire data to the schedule managing unit 104 (step S809). Unlike in a normal data file, the data is not divided into pieces of a cluster size and the entire data is written at one time, which increases processing efficiency.

In the above-described cases, a process performed by the schedule managing unit 104 after receiving a writing instruction will be described later together with a reading process.

Figure 11:
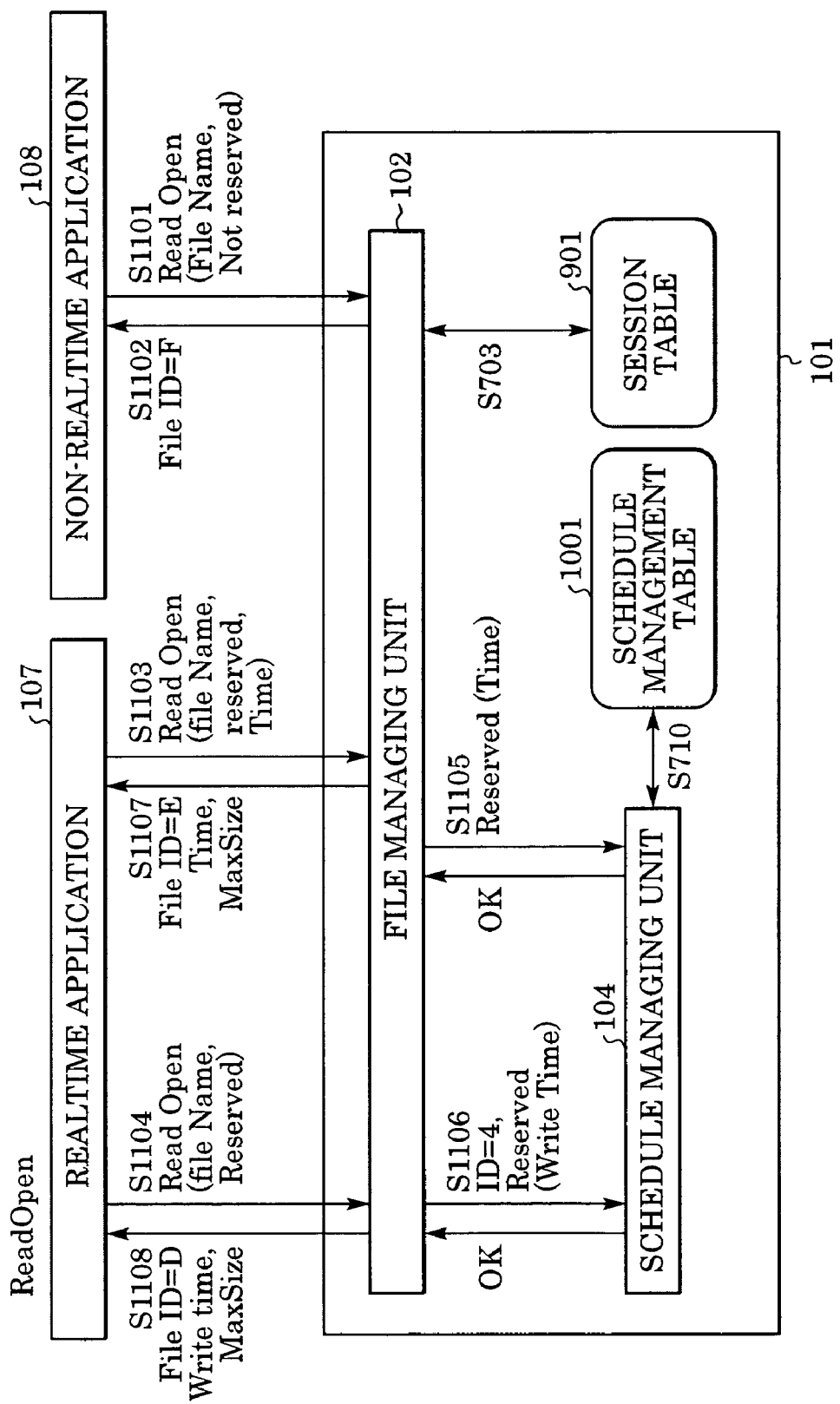
FIG. 11 illustrates a process of reading a created file according to the embodiment.
Figure 12:
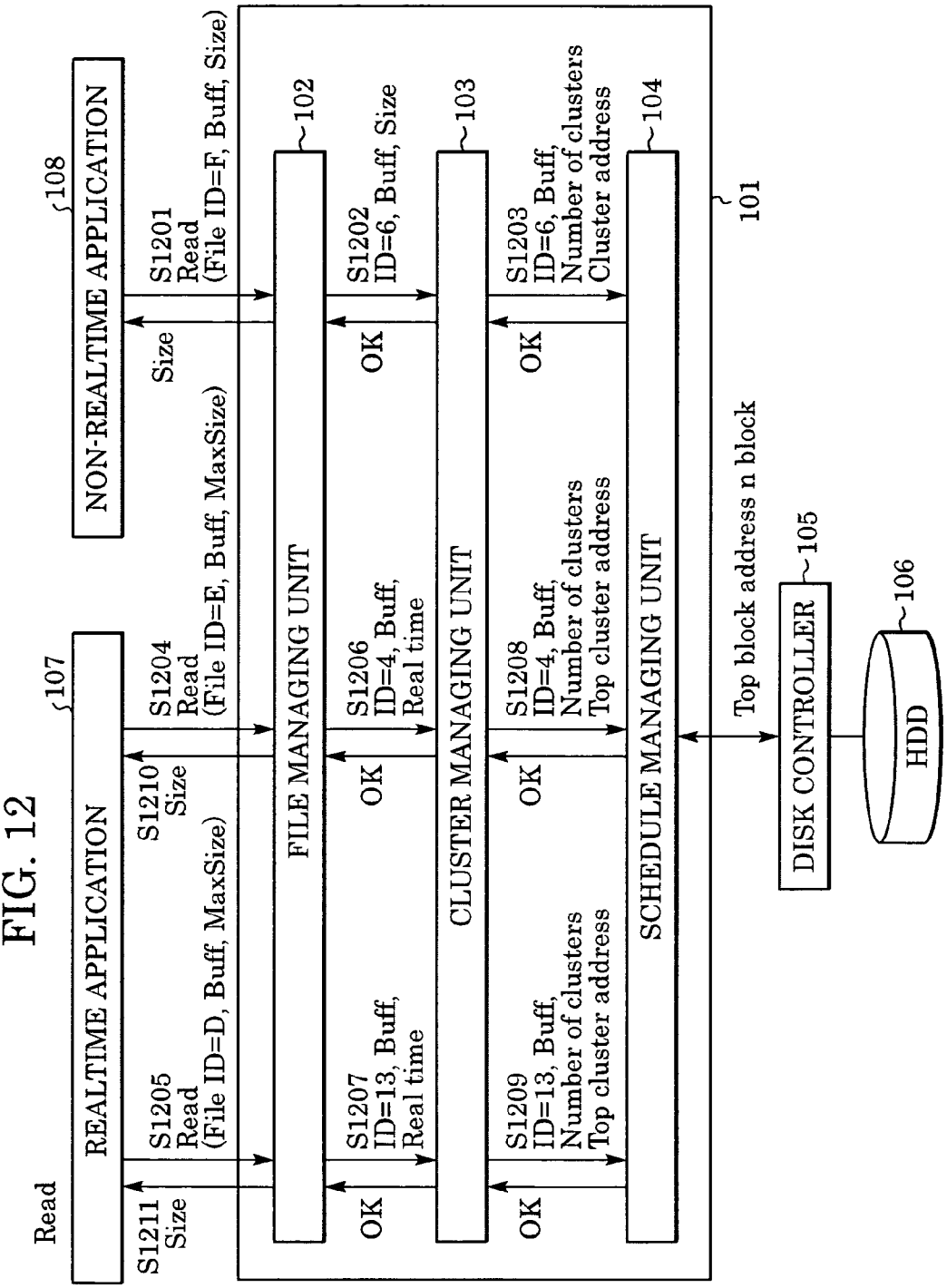
FIG. 12 illustrates a process of reading a created file according to the embodiment.

Next, a process of reading a created file is described. FIGS. 11 and 12 illustrate a process of reading a created file.

First, a process of reading a normal data file is described (same as in the conventional file system).

In order to read a file, the application 108 issues a ReadOpen request to the file system 101. The application 108 issues the ReadOpen request, with a file name being a parameter (step S1101).

The file managing unit 102 of the file system 101 receives the request and checks whether an ID information entry having this file name exists in a directory cluster of a corresponding directory.

If the ID information entry does not exist, the ReadOpen process ends as an error. If the ID information entry has been found, a management information entry is obtained and a file identifier for identifying this Read session between the application 108 and the file system 101 is assigned. Then, the file managing unit 102 associates the management information entry with the file identifier and registers them in the session table 901 together with an input/output type. Further, the file managing unit 102 notifies the application 108 of the file identifier (step S1102) so as to end the ReadOpen process.

After a successful ReadOpen process, the application 108 issues a Read request for each data piece having a predetermined size and reads the file. Parameters used at the Read request include the file identifier assigned at the ReadOpen process, a reading size, and a pointer to a buffer ensuring an amount of buffer for the reading size (step S1201 of FIG. 12).

The file managing unit 102 receives the Read request, refers to the session table 901 based on the file identifier (907 in FIG. 9), and finds a management information entry number (in this case 6). Then, the file managing unit 102 transmits a Read request to the cluster managing unit 103, with the entry number being a parameter (step S1202).

The cluster managing unit 103 transmits a Read request for each cluster address recorded in the management information entry to the schedule managing unit 104 (step S1203). The process of reading a cluster is repeated until reaching the reading size required by the application 108.

Also, the application 108 is capable of reading a realtime data file as well as a normal data file. However, the process performed in that case is different from that of reading a normal data file in the process performed by the cluster managing unit 103. This is because a management information entry for a realtime data file records pairs of cluster addresses and a size of respective recording units. The realtime data file is read in units of clusters, and the reading process continues until reaching the reading size required by the application 108.

Next, a process of reading a realtime data file is described.

The application 107 issues a ReadOpen request with a file name being a parameter, as in a normal data file. Also, the application 107 specifies a realtime reading. At this time, if the application 107 specifies a reading unit time (step S1103 of FIG. 11), the specified unit time is used. If the application 107 does not specify a reading unit time (step S1104), the recording unit time specified at creation of the file is used as a reading unit time. Normally, the reading unit time need not be specified. However, for example, when video stream data needs be played back slowly, the unit time must be longer than the recording unit time.

The file managing unit 102 of the file system 101 receives the request and checks whether an ID information entry having this file name exists in a directory cluster of a corresponding directory.

If the ID information entry does not exist, the ReadOpen process ends as an error. If the ID information entry has been found, the file managing unit 102 obtains a management information entry recorded in the ID information entry and checks whether the specified file is a realtime data file. If the specified file is not a realtime data file, realtime reading cannot be performed, and the ReadOpen process ends as an error.

After determining that the specified file is a realtime data file, the file managing unit 102 assigns a file identifier for identifying this Read session between the application 107 and the file system 101. Also, the file managing unit 102 associates the management information entry with the file identifier, clearly indicates that the process is realtime reading, and registers the entry number and the file identifier in the session table 901 (905 and 906 in FIG. 9).

At the same time, the file managing unit 102 requests the schedule managing unit 104 to ensure a realtime performance by using the time specified by the application 107 or the recording unit time recorded in the management information entry as a parameter (steps S1105 and S1106).

The schedule managing unit 104 receives the request, estimates a time period required for reading recording units based on the recording unit maximum size in the management information entry. Further, the schedule managing unit 104 refers to the schedule management table 1001 together with the unit time transmitted from the file managing unit 102, so as to determine whether a realtime performance can be ensured.

The schedule managing unit 104 notifies the file managing unit 102 of the determination result. If it is determined that a realtime performance can be ensured, the schedule managing unit 104 registers the management information entry number, the reading unit time, and the estimated reading time in the schedule management table 1001 (1003 and 1004 in FIG. 10). If it is determined that a realtime performance cannot be ensured, the schedule managing unit 104 notifies the file managing unit 102 of that fact. In this case, the ReadOpen request from the application 107 cannot be accepted, so that the file cannot be read.

After a realtime performance has been successfully ensured, the file managing unit 102 notifies the application 107 of the file identifier, the recording unit maximum size held in the management information entry, and the reading unit time (steps S1107 and S1108), and then the ReadOpen process ends.

After the ReadOpen process has been successfully done, the application 107 issues a Read request for each reading unit time. A read buffer for the recording unit maximum size notified at the ReadOpen request is prepared as a parameter, and a reading size is set to the recording unit maximum size (steps S1204 and S1205). Actually, data of the set size is not read, but data of a recording unit size held in the management information entry is read.

The file managing unit 102 receives the Read request, refers to the session table 901 based on the file identifier, and finds the management information entry and that this process is realtime reading. By using the obtained information as parameters, the file managing unit 102 transmits a Read request to the cluster managing unit 103 (steps S1206 and S1207).

The cluster managing unit 103 requests the schedule managing unit 104 to read data of a recording size from the top cluster address of a recording unit recorded in the management information entry (steps S1208 and S1209). In this process, data of a recording unit is read at one time without dividing it into clusters, and thus a high processing efficiency can be obtained unlike in a process of reading normal data. The size of the data which has been actually read is notified to the application 107 after reading has been successfully done (steps S1210 and S1211).

In the above description, processes of creating and reading a file performed by the file managing unit 102 and the cluster managing unit 103 have been described.

A process performed by the schedule managing unit 104 is described next.

When receiving file input/output requests from a plurality of applications, the schedule managing unit 104 cannot provide a plurality of input/output instructions to the disk controller 105 at the same time. Therefore, the schedule managing unit 104 needs to queue the requests and process them one by one.

Basically, the requests are processed in the order of their arrival. However, priority is placed on a realtime input/output request because the input/output process must be finished within a unit time informed at realtime input/output. At an Open process, time required for inputting/outputting a recording unit is estimated, the adequacy of the time and an occupancy rate of each session are evaluated, and realtime input/output requests among queued requests are preferentially processed in order to prevent acceptance of excessive realtime sessions. Accordingly, a required realtime performance can be ensured. Also, since sequential clusters are input/output at one time, high processing efficiency can be obtained. After all of the queued realtime input/output requests have been processed, normal input/output requests are sequentially processed.

In order to perform an input/output process, cluster addresses and the number of clusters are converted to block numbers of the HDD 106 and the number of blocks, and an input/output command is transmitted to the disk controller 105.

As described above, the file system capable of efficiently dealing with both a normal data file and a realtime data file can be realized.

Figure 13:
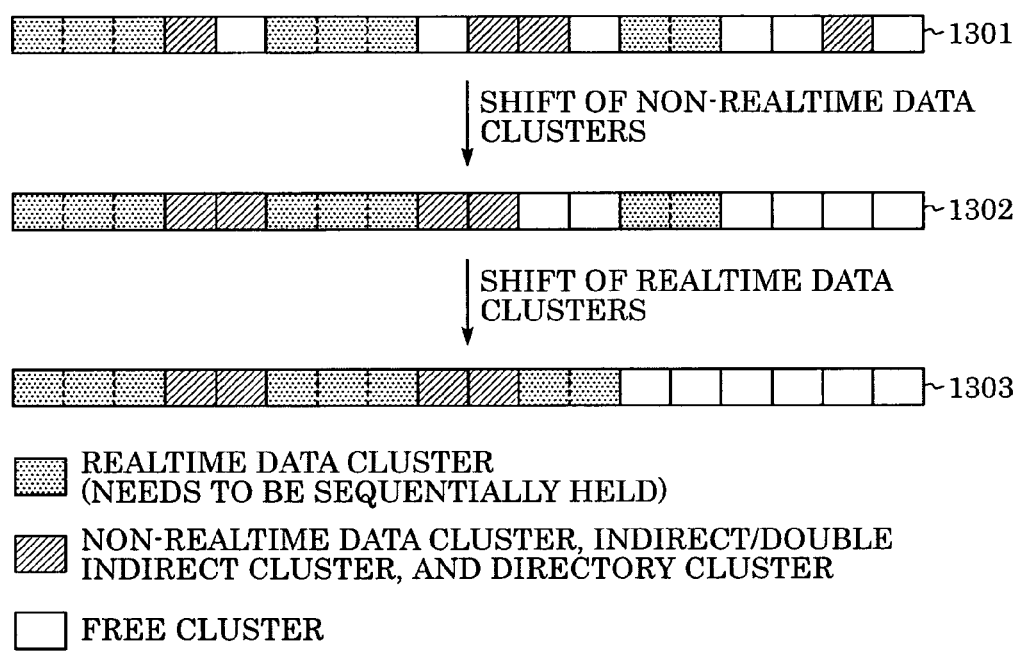
FIG. 13 illustrates defragmentation of clusters according to the embodiment.

FIG. 13 illustrates a process of shifting clusters. A cluster is composed of sequential blocks, each having a small data size, and serves as a basic recording unit. Therefore, an unused cluster area is fragmented as shown in FIG. 13 by repeating creation and deletion of files. If a user wants to create a realtime data file under this state, sequential clusters required for a recording unit may not be obtained (1301). In order to prevent such a state, the following block shifting process (defragmentation) is performed.

First, scattering direct data clusters of a normal data file and non-sequential free clusters are exchanged based on the cluster map. Then, the content of the direct data clusters is copied to the free clusters, and cluster addresses recorded in a management information entry to which the direct data clusters belong are changed to cluster addresses of a copy destination. Further, the cluster map is updated. This process is repeatedly performed.

Then, indirect data clusters, double indirect data clusters, and directory clusters are shifted regardless of the type of data: normal data or realtime data (1302). Finally, sequential direct data clusters of realtime data are shifted (1303). Note that this process is performed while preventing fragmentation of sequential clusters.

With this process, an area of sequential free clusters enlarges, and thus sequential clusters can be easily obtained.

According to the above-described embodiment, realtime data files and normal data files can be collectively managed by introducing a management information entry for a realtime data file. Also, according to the above-described embodiment, each recording unit of a realtime data file is composed of sequential clusters. Therefore, the realtime data file can be transferred (read or written) at one time in units of recording units, so that input/output efficiency increases.

Further, according to the above-described embodiment, a size of a cluster used as a unit of input/output is small, and thus a usage efficiency of the HDD increases. Also, by performing defragmentation, the usage efficiency can further increase.

Further, according to the above-described embodiment, the schedule managing unit is provided in the file system. With this configuration, a realtime performance can be ensured even when a plurality of realtime data files and normal data files are processed at the same time. This file system is useful in a stream distribution server for distributing video or music stream data to a plurality of terminals at the same time.

According to the present invention, a large amount of stream data, such as digital video and audio data, can be read/written in real time. At the same time, a normal data file of a small size can be efficiently processed.

While the present invention has been described with reference to an exemplary embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-158017 filed May 27, 2004, which is hereby incorporated by reference herein.

What is claimed is:

1. A file system comprising:

a recording device configured to divide data into data units, each data unit corresponding to a predetermined time interval, and to record the data units at a series of blocks in a recording apparatus so as to form a file;

a first determining device configured to determine whether the data can be recorded while ensuring a realtime performance based on a recording schedule of other data before the recording device performs a data recording process; and a managing device which records a data recording unit time and a maximum size of the recording unit data sizes as characteristics of a file and which collectively manages the files of two different types in a management information format, wherein the recording device performs the data recording process in accordance with the determination made by the first determining device, wherein a cluster consisting of a predetermined number of sequential blocks is regarded as a basic recording unit and wherein the recording device records realtime data in the recording apparatus by using at least one series of clusters as a recording unit, wherein the recording device records a file configuration of a data file that does not require a realtime performance by using addresses of the series of clusters, and wherein the recording device records a file configuration of a data file that requires a realtime performance by using pairs of a top cluster address of the series of clusters and a recording unit data size.

2. The file system according to claim 1, further comprising;

a reading device configured to read entire data recorded in the series of blocks at one time from the recording apparatus.

3. The file system according to claim 2, further comprising:

a second determining device configured to determine whether the data recorded in the series of blocks can be read while ensuring a realtime performance based on a reading schedule of other data before the reading device performs a data reading process, wherein the reading device performs the data reading process in accordance with the determination made by the second determining device.

4. The file system according to claim 1, wherein the first determining device determines whether a realtime performance can be ensured based on the recording unit time and the recording unit data size before recording a file that requires a realtime performance, the first determining device does not permit a data recording process if the realtime performance cannot be ensured, and the managing device manages a schedule of the data recording process if the data recording process has been permitted.

5. A file recording method comprising:

dividing data into data units, each data unit corresponding to a predetermined time interval;

determining whether the data can be recorded while ensuring a realtime performance based on a recording schedule of other data; and recording the data units at a series of blocks in a recording apparatus so as to form a file in accordance with the determination as to whether the data can be recorded while ensuring realtime performance based on the recording schedule of other data, wherein a cluster consisting of a predetermined number of sequential blocks is regarded as a basic recording unit and wherein the realtime data is recorded by using at least one series of clusters as a recording unit, wherein a file configuration of a data file that does not require a realtime performance by using addresses of the series of clusters is recorded by a recording device, wherein a file configuration of a data file that requires a realtime performance by using pairs of a top cluster address of the series of clusters and a recording unit data size is recorded by the recording device, and wherein a data recording unit time and a maximum size of recording unit data sizes are recorded as characteristics of a file and the files are collectively managed as two different types in a management information format.

6. The file recording method according to claim 5, further comprising reading entire data recorded in the series of blocks at one time from the recording apparatus.

7. The file recording method according to claim 6, further comprising:

determining whether the data recorded in the series of blocks can be read while ensuring a realtime performance based on a reading schedule of other data before reading the entire data recorded in the series of blocks at one time from the recording apparatus, wherein reading the entire data recorded in the series of blocks at one time from the recording apparatus is performed in accordance with the determination of whether the data recorded in the series of blocks can be read while ensuring realtime performance.

8. The file recording method according to claim 5, wherein determining whether the data can be recorded while ensuring a realtime performance based on a recording schedule of other data is based on the recording unit time and the recording unit data size before recording a file that requires a realtime performance, and a data recording process is not permitted if the realtime performance cannot be ensured, and a schedule of the data recording process is managed if the data recording process has been permitted.

* * * * *